(12) United States Patent
Ezrielev et al.

(10) Patent No.: US 12,306,936 B2
(45) Date of Patent: May 20, 2025

(54) SYSTEM AND METHOD FOR MANAGEMENT OF INFERENCE MODELS BASED ON TRAINING DATA IMPACT ON MODEL REVERSION

(71) Applicant: Dell Products L.P., Round Rock, TX (US)

(72) Inventors: Ofir Ezrielev, Be'er Sheva (IL); Tomer Kushnir, Omer (IL); Amihai Savir, Newton, MA (US)

(73) Assignee: Dell Products L.P., Round Rock, TX (US)

(*) Notice: Subject to any disclaimer, the term of this patent is extended or adjusted under 35 U.S.C. 154(b) by 286 days.

(21) Appl. No.: 18/193,810

(22) Filed: Mar. 31, 2023

(65) Prior Publication Data
US 2024/0330438 A1   Oct. 3, 2024

(51) Int. Cl.
*G06F 21/55* (2013.01)
*G06F 21/00* (2013.01)

(52) U.S. Cl.
CPC ................... *G06F 21/55* (2013.01)

(58) Field of Classification Search
CPC ........ G06F 21/55; G06F 21/50; G06F 21/552; G06F 21/554; G06F 21/56; G06F 21/562; G06F 21/568; G06F 21/577
See application file for complete search history.

(56) References Cited

U.S. PATENT DOCUMENTS

| | | |
|---|---|---|
| 6,922,816 B1 | 7/2005 | Amin et al. |
| 10,936,173 B2 | 3/2021 | Ubillos et al. |
| D917,546 S | 4/2021 | Mayler et al. |
| 11,449,942 B2 | 9/2022 | Basu et al. |
| 11,460,997 B2 | 10/2022 | Homma et al. |
| 2020/0050945 A1* | 2/2020 | Chen .................. G06F 18/214 |
| 2020/0387833 A1* | 12/2020 | Kursun ................ G06N 20/20 |

OTHER PUBLICATIONS

Herbig, Maik, "GUI-based software for training, evaluating and applying deep neural nets for image classification," Web Page <https://github.com/maikherbig/AIDeveloper> accessed on Nov. 21, 2022 (7 Pages).
Czakon, Jakub, "Best Tools to Do ML Model Monitoring," Web Page <https://neptune.ai/blog/ml-model-monitoring-best-tools> accessed on Nov. 21, 2022 (20 Pages).

* cited by examiner

*Primary Examiner* — Edward Zee
(74) *Attorney, Agent, or Firm* — WOMBLE BOND DICKINSON (US) LLP

(57) ABSTRACT

Methods and systems for managing inference models are disclosed. The inference models may be used to provide computer implemented services by generating inferences used in the services. The inference models may be managed by reverting inference models that are found to be compromised through training with poisoned training data. The type of reversion and training data to be used may be selected based on the cost for performing the reversion and benefits provided by the reverted inference model using graphical user interfaces.

20 Claims, 12 Drawing Sheets

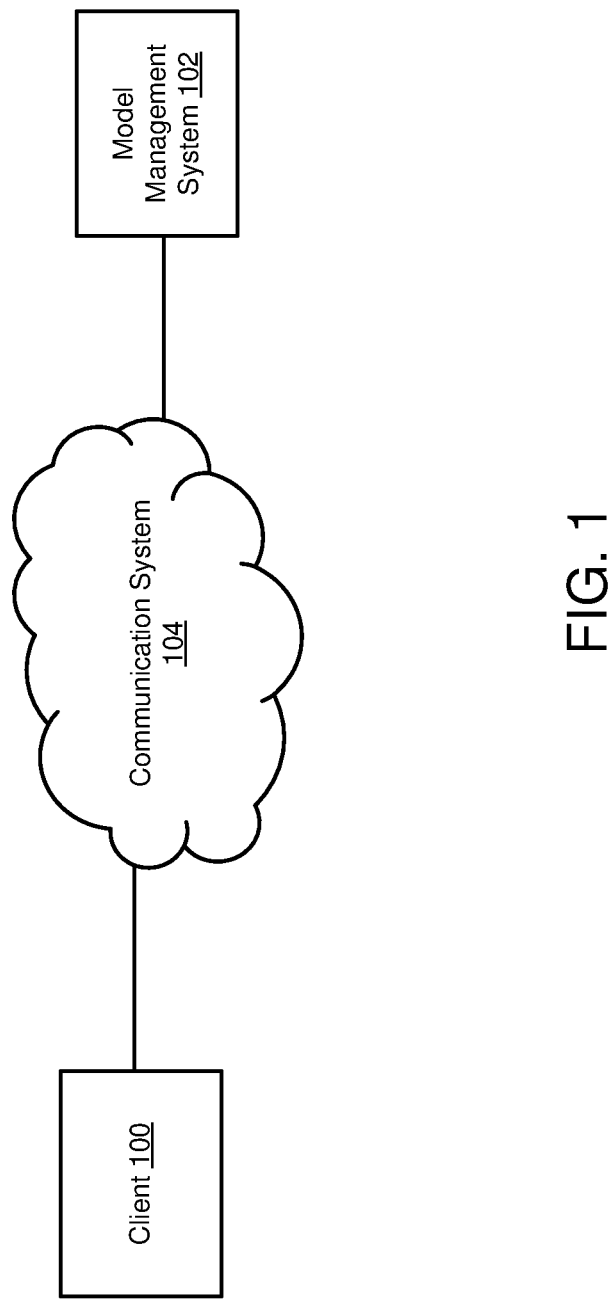

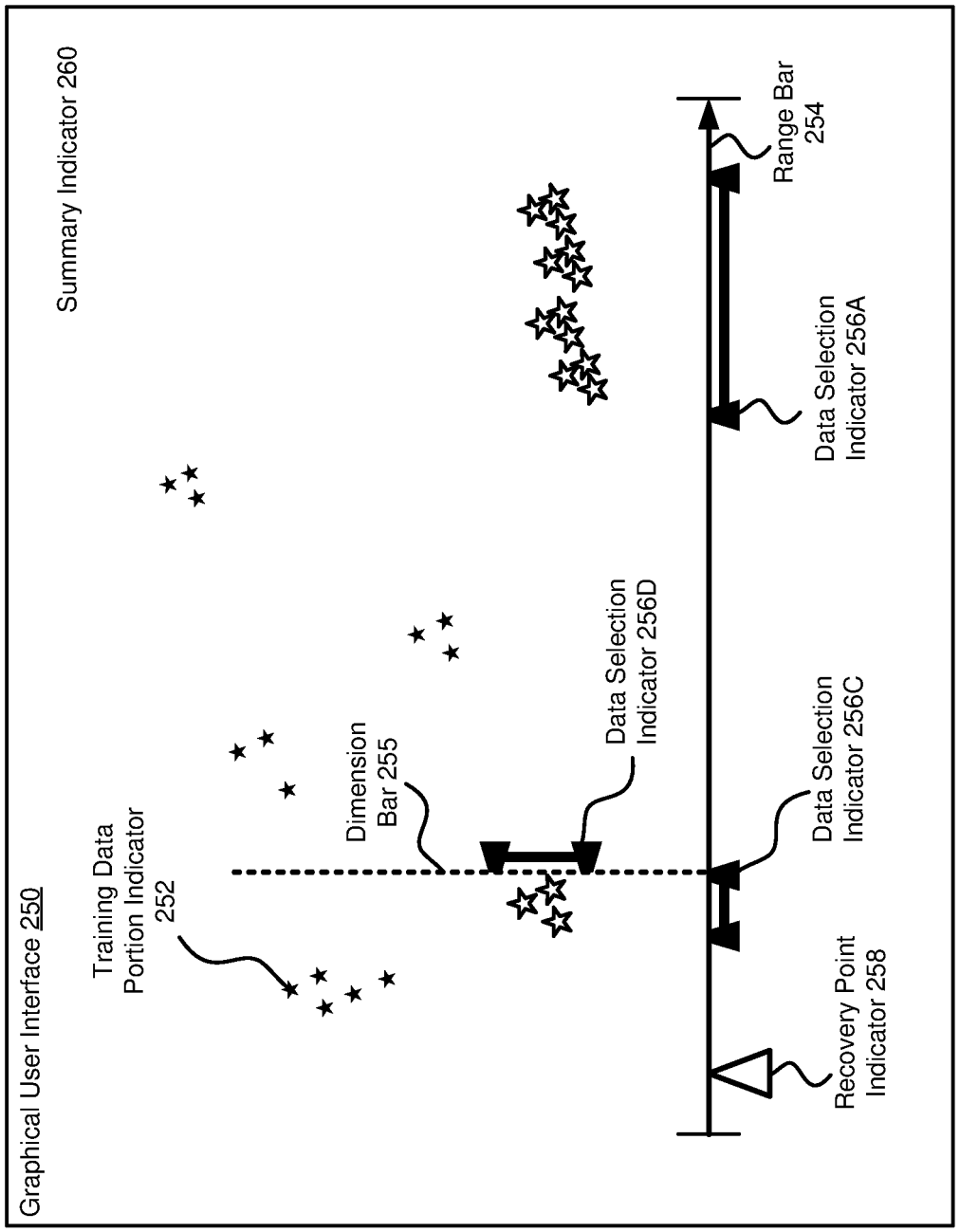

SYSTEM AND METHOD FOR MANAGEMENT OF INFERENCE MODELS BASED ON TRAINING DATA IMPACT ON MODEL REVERSION

FIELD

Embodiments disclosed herein relate generally to inference model management. More particularly, embodiments disclosed herein relate to systems and methods to manage inference model management through reversion.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a block diagram illustrating a system in accordance with an embodiment.

FIGS. 2B, 2C, 2D, 2E, 2F, 2G, and 2H show diagrams illustrating graphical user interfaces in accordance with an embodiment.

DETAILED DESCRIPTION

Figure 2A:
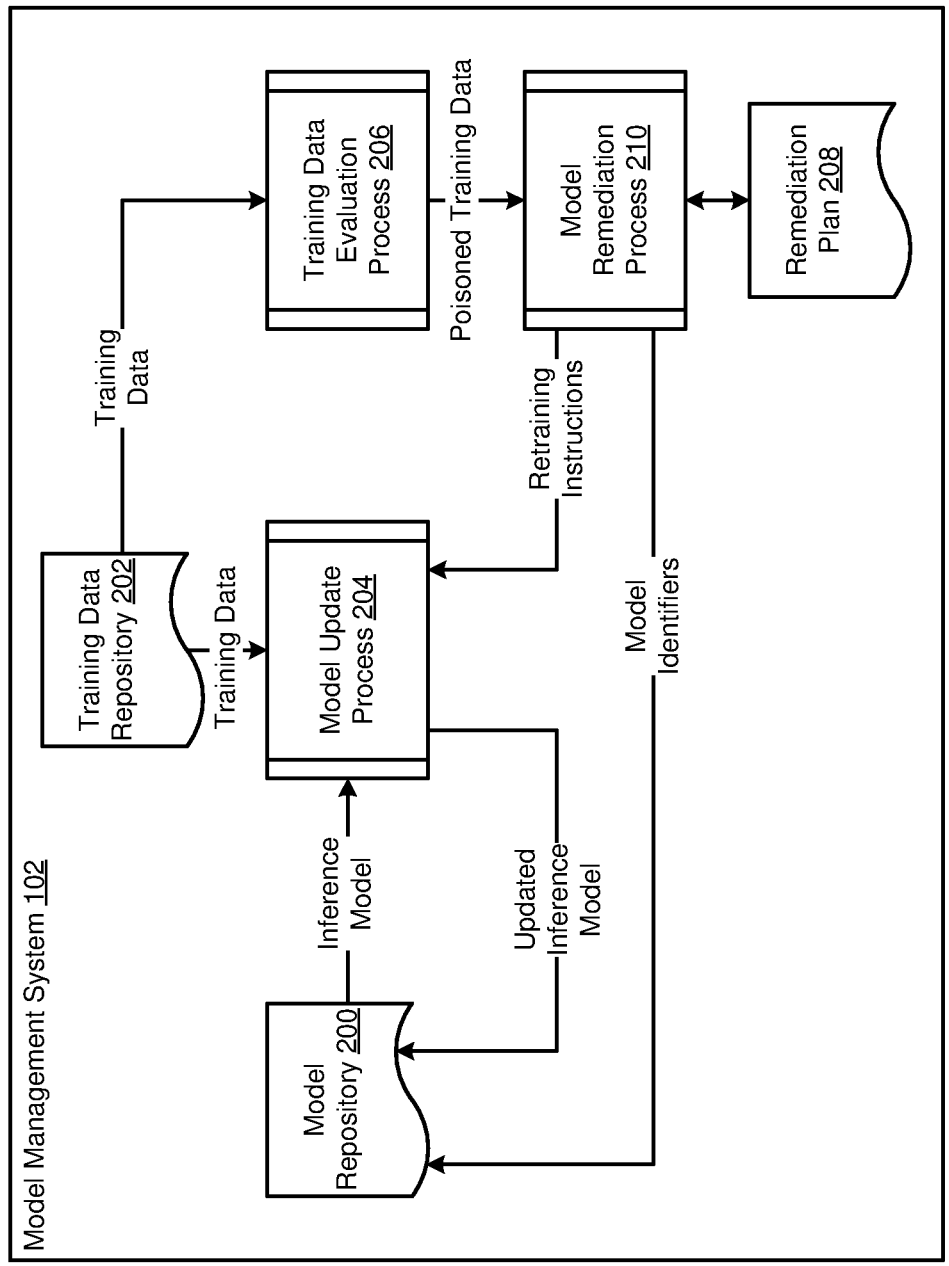
FIG. 2A shows a diagram illustrating data flows in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing inference models. The inference models may be used to provide computer implemented services. Inferences generated by the inference models may be used during performance of the computer implemented services.

Over time the inference models may be updated. However, updating the inference models may result in the inference models generated undesirable inferences. For example, poisoned training data that may taint the inference models may be inadvertently used during the model update process.

To manage the tainted inference models, reversions may be performed to reduce or eliminate an influence of the poisoned training data on the inferences generated by the inference models. However, the resource cost for performing reversions may be significant.

To manage reversion of inference models, a first graphical user interface may be presented to a user. The user may explore options for performing different types of reversions, and ascertain the resource cost for the different types of reversions. By allowing the user to explore the tradeoffs associated with the different reversions, the user may be better able to select the type of reversion to perform while managing an impact of the consumption of resources for performing the reversion.

Once a reversion is selected, a second graphical user interface may be presented to the user. Through the second graphical user interface, the user may explore options for excluding certain training data from being used during the reversion. Estimates for impacts on the reversion due to the excluded training data may be presented to the user so that the user may select a portion of the training data to use in the reversion that balances the resource cost for performing the reversion against the benefits obtained through the reversion.

Once a user selects the type of reversion to perform and the training data to use during the reversion, the reversion may be performed. The resulting updated inference model may be partially or substantially completely free of the influence of at least some of the poisoned training data on inferences produced by the updated inference model.

By doing so, embodiments disclosed herein may improve the likelihood that inference obtained using inference models are desirable. A system may do so by proactively identifying costs for performing different types of reversions using various quantities of training data, and allowing the user to explore the different options for performing reversions. Thus, embodiments disclosed herein may provide a system that reduces the cognitive burden on users for management of the system. By enabling the user to explore the likely costs and benefits of different types of reversions using various portions of training data, reversions that are better aligned with the computing resource availability of the system may be selected. Consequently, the system may be less likely to experience slowdowns due to lack of computing resources while reversions are performed.

In an embodiment, a method for managing inference models is disclosed. The method may include identifying an inference model of the inference models that is tainted through training using poisoned training data; identifying a first resource cost for reverting the inference model to remove influence of the poisoned training data on the inference model; obtaining, using a graphical user interface, user input indicating a selection of a portion of the poisoned training data; identifying a second resource cost for reverting the inference model to remove influence of the portion of the poisoned training data on the inference model; obtaining a reversion plan for the inference model based on the second resource cost; performing the reversion plan to obtain an updated inference model; and using the updated inference model to provide computer implemented services.

Obtaining the user input may include presenting, to a user, the graphical user interface that includes: a range bar, training data portion indicators, and data selection indicators that discriminate a portion of the training data portion indicators. The portion of the training data portion indicators may be associated with the portion of the poisoned training data. Obtaining the user input may also include obtaining, from the user via the graphical user interface, the user input to position the data selection indicators along the range bar, the position of the data selection indicators defining the portion of the training data portion indicators.

Obtaining the user input may include reducing a dimensionality of the poisoned training data to obtain locations for the training data portion indicators; and placing each training data portion indicator at a corresponding location of the locations, the locations being relative to the range bar.

The range bar may define a first axis of a two dimensional plot, with the first axis representing time progression and a second axis of the two dimensional plot representing the reduced dimensionality of the poisoned training data.

Each portion of the poisoned training data may be multidimensional, and reducing the dimensionality of each portion of the poisoned training data may provide a single magnitude for the respective portion of the poisoned training data.

Each of the training data portion indicators may be positioned: along the range bar based on when a corresponding portion of the poisoned training data was obtained, and a distance away from the range bar based on the single magnitude for the corresponding portion of the poisoned training data.

The second resource cost may be less than the first resource cost.

Performing the reversion plan to obtain the updated inference model may include training the inference model based on portion of the poisoned training data to reduce the predictive power of the inference model for relationships defined by the portion of the poisoned training data.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

The computer implemented services may be provided at least in part using inference models. The inference models may be implemented using machine learning models such as neural networks, decision trees, support vector machines, clustering, and/or other types of learning models.

The inference models may be obtained by (i) obtaining training data (labeled and/or unlabeled) that reflects relationships for which inferences are to be generated, and (ii) generating trained inference models using the training data. Once obtained, the inference models may generate inferences as output for ingest data (e.g., which may include any number and types of features).

Overtime, additional training data may be obtained. The operation of the inference models may be updated using the additional training data. The inferences generated by the updated inference models may reflect the additional information included in the additional training data.

However, updates to inference models may, over time, modify the inference models in undesirable manners. For example, a malicious entity may attempt to inject malicious training data (e.g., poisoned training data) into the update process. If used to update the operation of the inference models, the resulting updated inference models may generate undesired inferences.

If the undesired inferences are used to provide computer implemented services, then the computer implemented services may be undesirable. For example, consider a scenario where an inference model provides inferences regarding future prices of a commodity based on current production information for the commodity. A malicious party may attempt to inject malicious training data into update processes that cause the updated inference models to generate inferences for the future price that may be exploited by the malicious party. A business may use the inferences to drive an automated purchasing process (e.g., a computer implemented service) which, if driven using the inferences from the updated inference model, may be exploited by the malicious party to profit on the automated purchasing process.

In general, embodiments disclosed herein may provide methods, systems, and/or devices for managing inference models. The disclosed systems may manage inference models in a manner that allows for the impacts of poisoned training data used to update inference models to be remediated.

To remediate the impact of poisoned training data, the disclosed systems may (i) retain information regarding updates made to inference models that allow the inference models to be reverted (e.g., by performing a reversion) to remove some or all of the influence of the poisoned training data on inferences generated by the reverted inference models, (ii) estimate the resource cost (e.g., computational resource cost, financial cost, etc.) for performing different types of reversions (e.g., complete reversions to remove all of the influence of the poisoned training data or partial reversions to remove the influence of a portion of the poisoned training data on the model), (iii) present, via a graphical user interface, the different types of reversions and associated costs to a user such that the user may explore and understand the different costs involved in the reversions, (iv) obtain, via the graphical user interface, user input indicating portions of poisoned training data to be used during a reversion and other portions of poisoned training data not to be used in the reversion, (v) obtain, via the graphical user interface, user input indicating the type of reversion to perform, and (vi) orchestrate performance of the type of reversion indicated by the user input. By doing so, embodiments disclosed herein may manage the impact of poisoned training data on operation of inference models while managing the cognitive burden on a user for managing the inference models as well as computational cost for the reversion. Through the use of the graphical user interface, the cognitive burden on the user may be reduced by allowing the likely resource costs involved with various reversions to be explored by the user. Thus, the burden cognitive on a user for making a selection that balances benefits obtained versus costs involved in reversions may be reduced.

To provide the above noted functionality, the system of FIG. 1 may include client 100 and model management system 102. Each of these components is discussed below.

Client 100 may provide and/or use computer implemented services. The computer implemented services may utilize inference models, as discussed above. For example, client 100 may host inference models that generate inferences used to provide computer implemented services, may use computer implemented services provided by other entities that utilize inference models, etc.

Model management system 102 may manage inference models. To manage the inference models, model management system 102 may (i) obtain the inference models, (ii) update the inference models, (iii) identify when inference models are likely impacted by poisoned training data, (iv) interact with a user via graphical user interfaces to identify reversions to be performed and portions of poisoned training data to be addressed in the reversions for the impacted inference models, and (v) orchestrate performance of the identified reversions for the inference models. Refer to FIG. 2A for additional details regarding evaluation and management of inference models.

Figure 2B:
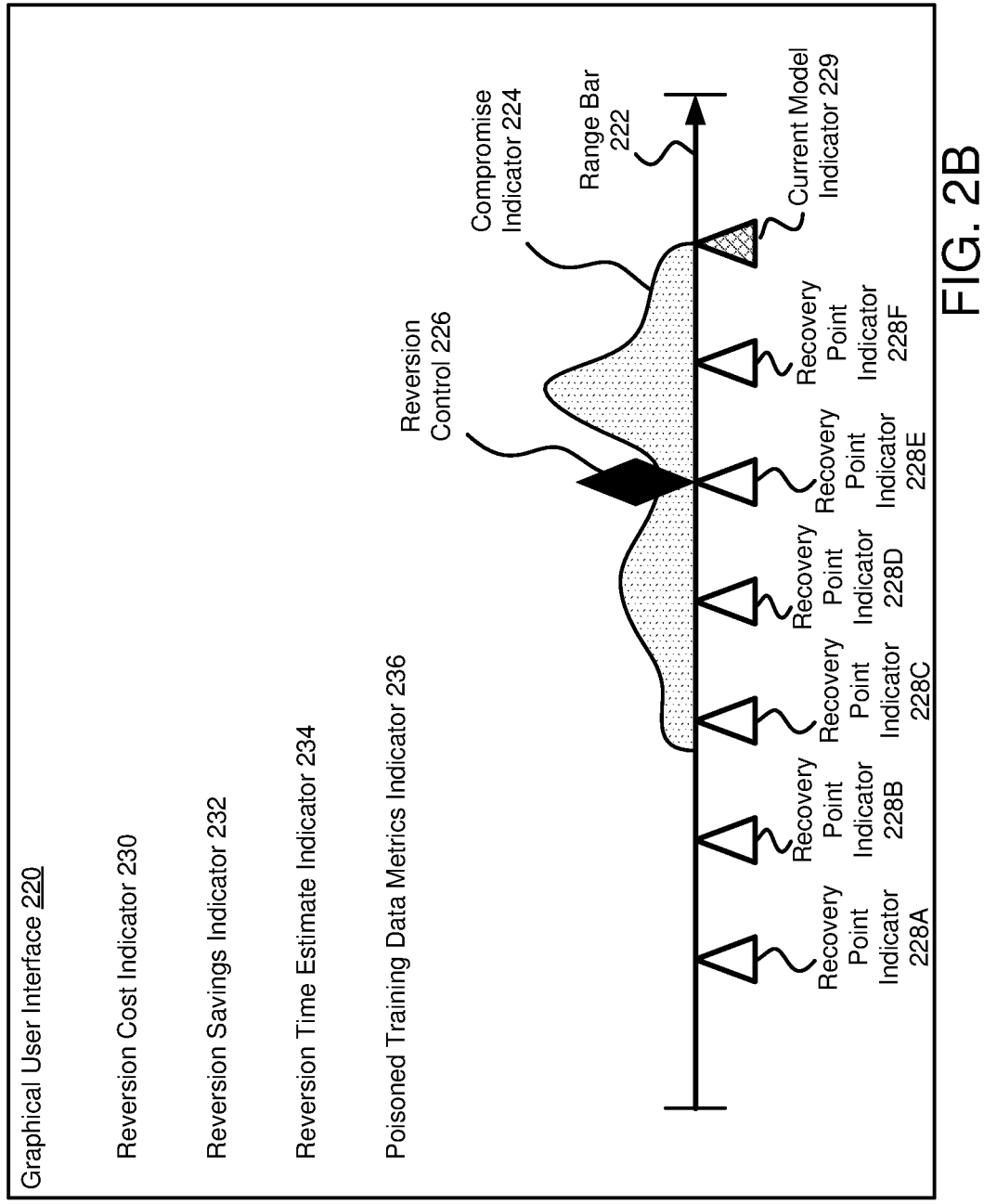
Figure 2C:
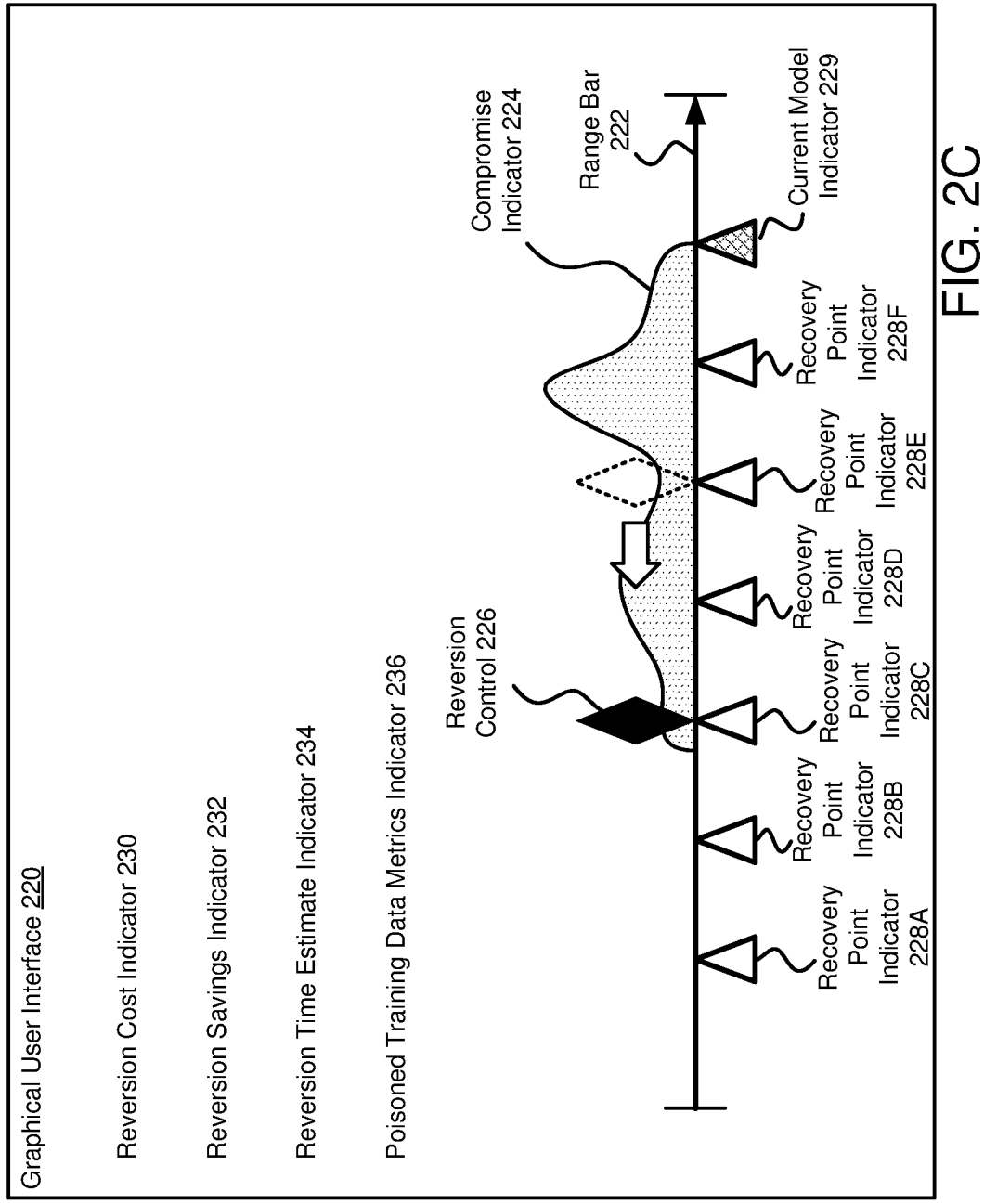
Figure 2D:
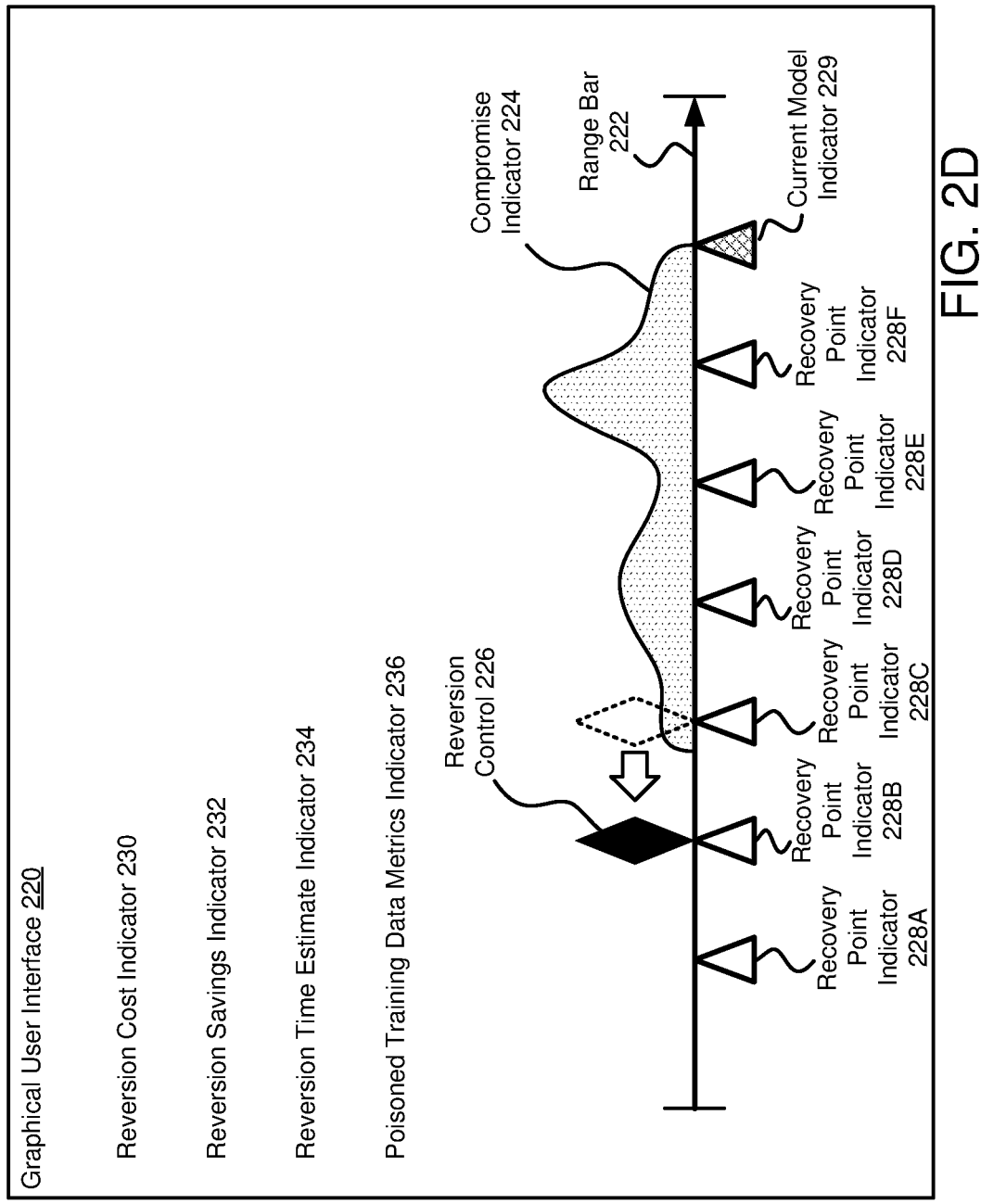

To identify reversions to be performed, model management system 102 may provide information (e.g., estimated resource costs) regarding potential reversions to a user and obtain user input indicating reversions to be performed. The information may be provided and user input may be collected using a graphical user interface. Refer to FIGS. 2B-2D for additional details regarding graphical user interfaces for exploring different types of reversions.

To identify training data to be addressed in the reversions, model management system 102 may provide information (e.g., estimated resource costs) regarding (i) training data that may be used in reversions to facilitate identification of more or less relevant training data, (ii) reversions that may be performed with different quantities of the training data, and (iii) resource costs involved and other factors for the reversions and quantities of training data. The information may be provided and user input may be collected using a graphical user interface. Refer to FIGS. 2E-2H for additional details regarding graphical user interfaces for exploring the importance of different portions of training data with respect to inference model reversion.

By managing inference models as disclosed herein, a system in accordance with embodiments may be more likely to provide desired computer implemented services. The computer implemented services may be more likely to be desired because the inferences used in providing the computer implemented services may be more likely to be accurate or meet expectations for use in the computer implemented services. The inferences may be more likely to be accurate or meet expectations through reversion of inference models that are likely to provide undesired inferences (e.g., by having been updated using poisoned training data).

However, due to the resource costs involved in selecting how models are to be reverted, selection of reversions that appropriately balance the resource cost against benefits obtained by performing the reversions may be challenging to identify. Through use of a graphical user interface, the cognitive burden for balancing the cost and benefit may be reduced. The graphical user interface may also a user to identify contributions of training data on tainted inference models, thereby allowing the user to granularly select the extent to which a model is reverted. By doing so, the disclosed system may be less likely to needlessly consume resources that provide an undesirably low level of benefit for inference generation. Thus, embodiments disclosed herein may address, among others, the technical problem of limited available computing resources in a distributed system. The disclosed embodiments may address the lack of computing resources by more efficiently marshaling limited computing resources for providing computer implemented services by improving the ratio of benefits obtained through model reversion against the resource cost for performing the reversions.

Figure 3A:
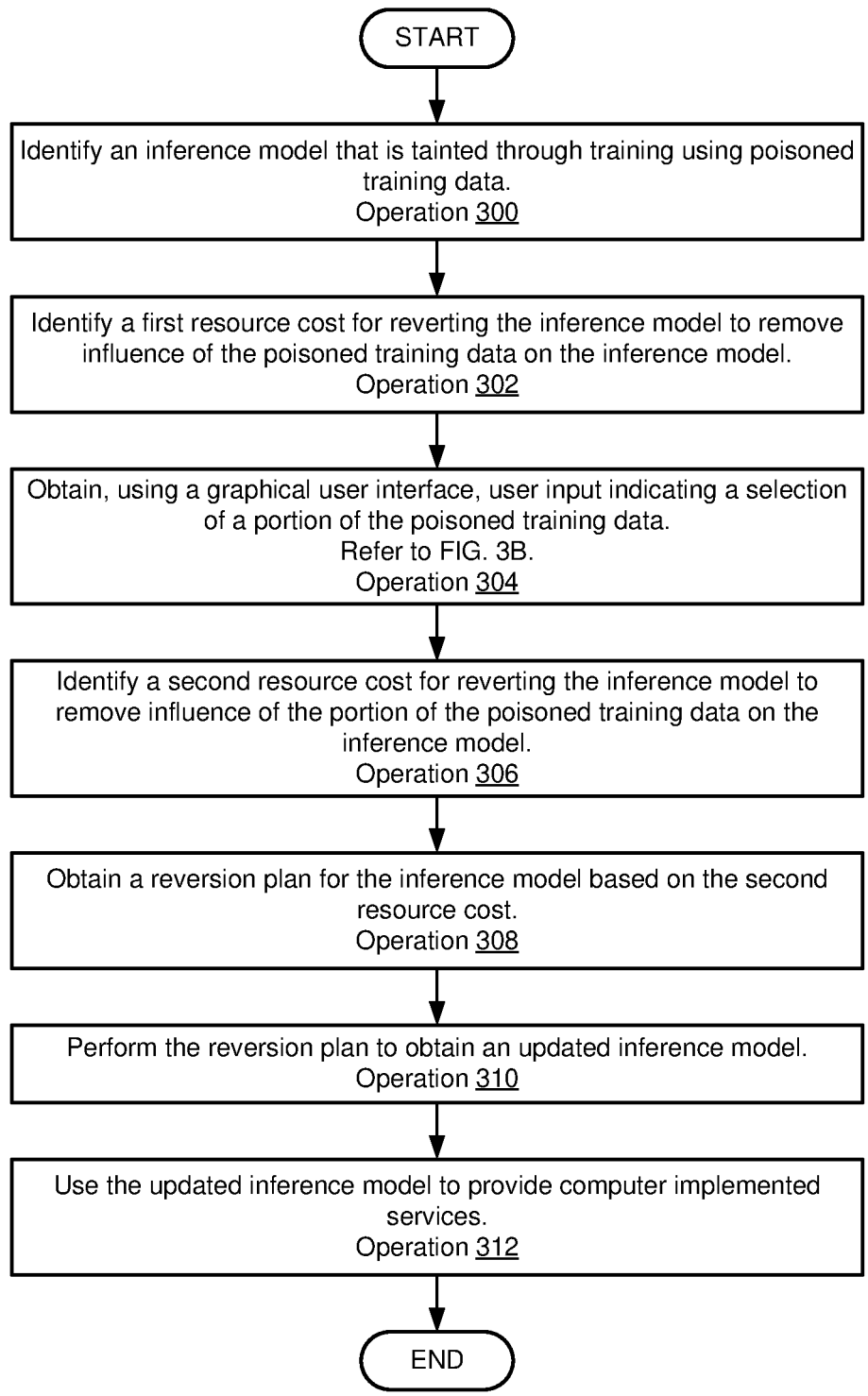
FIGS. 3A-3B show flow diagrams illustrating methods of managing inference models in accordance with an embodiment.
Figure 3B:
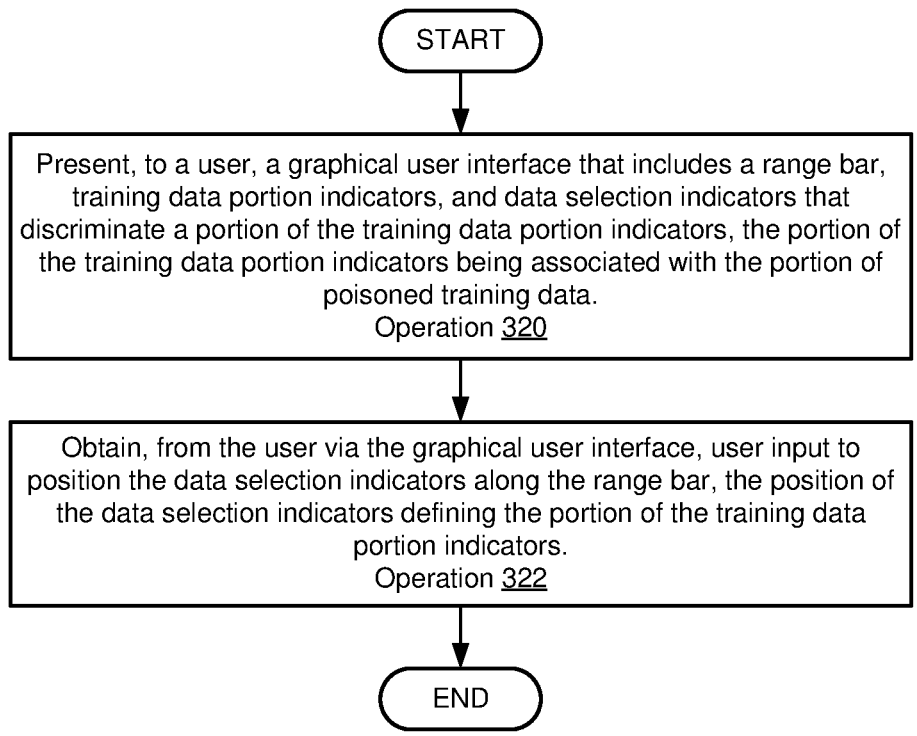

When providing their functionality, any of client 100 and model management system 102 may perform all, or a portion, of the methods illustrated in FIGS. 3A-3B.

Any of client 100 and model management system 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Model management system 102 may be implemented with multiple computing devices. For example, model management system 102 may be implemented with a data center, cloud installation, or other type of computing environment.

Any of the components illustrated in FIG. 1 may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein. For example, a system may include any number of instances of client 100, model management system 102, and/or other components not shown in FIG. 1. Any of the instances may perform similar and/or different functions.

To further clarify embodiments disclosed herein, a diagram illustrating data flows implemented by and data structures used by a system over time in accordance with an embodiment is shown in FIG. 2A.

Turning to FIG. 2A, a first data flow diagram illustrating data flows, data processing, and/or other operations that may be performed by the system of FIG. 1 in accordance with an embodiment is shown.

To facilitate computer implemented services using inferences, model management system 102 may (i) maintain, (ii) update, (iii) evaluate, and (iv) retain or revert inference models used by the system of FIG. 1.

To maintain the inference models, model management system 102 may include model repository 200. Any number of inference models may be stored in model repository 200. As inference models are updated over time, samples of the inference models (e.g., that are deprecated) or information usable to revert inference models to previous versions may be retained in model repository 200. Additionally, information regarding the training data on which the inference models are based may be maintained in model repository

200. Further, information regarding inferences generated by the inference models may be stored in model repository 200. Accordingly, if an inference model is updated and the inference model is subsequently identified as having been poisoned due to poisoned training data used in its updating, (i) the inference model may be reverted to a previous state (e.g., which may be free of all or some of the influence of the poisoned training data), (ii) inferences impacted by the poisoned inference model may be identified, and (iii) the poisoned training data upon which the poisoned inference model is based may be identified (e.g., an selectively used in inference model reversions).

To update the inference models, model management system 102 may include training data repository 202. Training data repository 202 may include any type and quantity of training data (e.g., used and usable to train the inference models in model repository 200). As new training data becomes available, the new training data may be added to the repository. The training data may be used to (i) train new inference models, (ii) update inference models, and/or (iii) revert inference models (e.g., through untraining processes).

For example, when new training data becomes available, a corresponding inference model and the new training data may be retrieved from the respective repositories 200, 202. Model update process 204 may use the new training data to update weights or other characteristics of the inference model to obtain an updated inference model.

However, as discussed above, some training data may be malicious in nature, may include relationships that if used for training purposes may result in undesired inferences (e.g., such as exhibiting latent bias), and/or may otherwise have undesirable impacts on the inference model during training. For example, the updated inference model may generate inferences that are inaccurate, exhibit latent bias, and/or may be undesirable for other reasons.

To manage risk associated with updating of inference models (and/or during generation of new inference models), the training data in training data repository 202 may be subjected to training data evaluation process 206. During training data evaluation process 206, various evaluation processes may be performed to identify whether any of the training data is likely poisoned. The evaluation processes may include analysis processes (e.g., looking for inconsistencies, statistical aberration, etc.) of the training data itself, of sources of the training data, etc. As new information regarding training data becomes available, the training data in training data repository 202 may be analyzed via training data evaluation process 206. Consequently, poisoned training data may be identified sometime after introduction into training data repository 202. Consequently, the poisoned training data may be identified after inference models are updated using the poisoned training data and used to generate inferences. Further, some inference models that are already influenced by the poisoned training data may be further updated with additional poisoned training data or training data that is not poisoned. Thus, any number of updated inference models (e.g., versions of the inference model) that are influenced by poisoned training data may be obtained and used prior to the poisoned training data being identified.

When poisoned training data is identified, the poisoned training data may be used to drive model remediation process 210. During model remediation process 210, (i) information regarding options for reverting a poisoned inference model may be presented to a user, (ii) the user may explore the options to select one of the operations for performance, and (iii) once selected, the selected option for reverting the poisoned inference models may be performed. To perform the selected reversion, stored previous versions of inference models may be utilized or retaining processes (e.g., untraining) may be performed.

If previous versions of an inference model are available, then model identifiers may be provided to model repository 200 to revert the inference model. The model identifiers may be used to (i) identify a previous version of an inference model to be used as the most current version going forward, and (ii) identify other versions of the inference model that are poisoned and to no longer to be used (e.g., deprecated, deleted, etc.).

If retaining processes are to be performed, retraining instructions may be provided to model update process 204. The retaining instructions may indicate (i) an inference model from model repository 200 to be updated, (ii) training data from training data repository 202 to be used during retraining, and (iii) a retraining process to be performed. The retraining process may be an untraining process where the poisoned inference model is trained in a manner to remove the impacts of the training data (e.g., poisoned training data) identified by the retraining instructions. The resulting updated inference model may be free (or substantially free) of the influence of the training data used in the untraining.

However, the resource cost (e.g., computational, time, financial, etc.) for performing the untraining may depend on the quantity of training data used in the untraining. To balance the benefit of updating the inference model against the resource cost for the updating, information regarding (i) the respective options for untraining may be presented to a user via a graphical user interface and (ii) the impact of selective retraining using only some of the training data used to obtain an inference model. Using this information, a user may make an informed decision regarding how to revert and inference model and information usable to define remediation plan 208 may be obtained from the user via the graphical user interface. Refer to FIGS. 2B-2H for additional details regarding graphical user interfaces.

Remediation plan 208 may include any amount of information regarding a process for reverting a poisoned inference model. As noted above, the content of remediation plan 208 may be obtained via a graphical user interface. The content of remediation plan 208 may indicate the model identifiers for reverting inference models and the retraining instructions for reverting inference models. The retraining instructions may specify the training data to be used during the reversion, goals for the reversion (e.g., number of training cycles to perform or criteria for terminating the untraining process), etc.

Once an updated inference model is obtained through reversion of a poisoned inference model, the updated inference model may be stored in model repository 200 and the corresponding poisoned inference models may be deprecated, deleted, and/or otherwise prevented from being used for inference generation purposes.

In an embodiment, model management system 102 is implemented using a hardware device including circuitry. The hardware device may be, for example, a digital signal processor, a field programmable gate array, or an application specific integrated circuit. The circuitry may be adapted to cause the hardware device to perform the functionality of model management system 102 as discussed herein. Model management system 102 may be implemented using other types of hardware devices without departing embodiment disclosed herein.

In an embodiment, model management system 102 is implemented using a processor adapted to execute computing code stored on a persistent storage that when executed by the processor performs the functionality of model management system 102 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, model management system 102 includes storage which may be implemented using physical devices that provide data storage services (e.g., storing data and providing copies of previously stored data). The devices that provide data storage services may include hardware devices and/or logical devices. For example, storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage may include a memory device (e.g., a dual in line memory device) in which data is stored and from which copies of previously stored data are provided. In another example, storage may include a persistent storage device (e.g., a solid-state disk drive) in which data is stored and from which copies of previously stored data is provided. In a still further example, storage may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage may store any of the data structures including remediation plan 208 discussed herein. Any of the data structures may be implemented using, for example, lists, tables databases, linked lists, unstructured data, and/or other types of data structures.

Turning to FIG. 2B, a first diagram of graphical user interface 220 in accordance with an embodiments is shown. Graphical user interface 220 may be used to (i) provide a user with information regarding options for reverting inference models and (ii) obtain user input indicating how an inference model is to be reverted. The user input may be used to establish a remediation plan (e.g., 208) for an inference model. Graphical user interface 220 may be presented to the user via a display (e.g., through a data processing system used by the person).

To provide the user with information regarding options for reverting an inference model, graphical user interface 220 may include range bar 222, compromise indicator 224, reversion control 226, recovery point indicators 228A-228F, current model indicator 229, reversion cost indicator 230, reversion savings indicator 232, reversion time estimate indicator 234, and poisoned training data metrics indicator 236. Each of these components of graphical user interface 220 is discussed below.

Range bar 222 may be implemented using one or more graphical elements along which other indicators (e.g., 224-229) may be positioned. Range bar 222 may be implemented using a line having a length. The positioning of these other indicators along range bar may indicate an ordering (e.g., temporal or relative) among the other indicators.

Compromise indicator 224 may be implemented using one or more graphical elements indicating quantities of poisoned training data on which various inference models are based. Compromise indicator 224 may be implemented using a filled area positioned along range bar 222. The filled area may represent the quantity of poisoned training data that was obtained over time and used to update an inference model over time. For example, a height of the filled are with respect to range bar 222 may indicate the relative quantities of poisoned training data obtained over time that was used to update versions of an inference model. Thus, a user may intuitively understand the relative quantity of poisoned training data on which each version of the inference model is based.

Reversion control 226 may be implemented using one or more graphical elements that may be manipulated by a user. For example, reversion control 226 may be positioned along range bar 222, and a user may slide reversion control 226 along range bar 222 to align with any of recovery point indicator 228A-228F. The user may position reversion control 226 with a recovery point indicator to (i) obtain information regarding resource costs for performing a reversion associated with the recovery point and (ii) select the reversion associated with the recovery point for performance. To explore options for managing the resource cost for performing different reversions, the user may invoke an additional graphical user interface by clicking or otherwise providing user input while reversion control 226 is aligned with one of the other indicators. Through the additional graphical user interface, the user may fine tune the training data to be used during the reversion thereby managing computational overhead for performing the reversions. Refer to FIGS. 2E-2H for additional details regarding the additional graphical user interface. Refer to FIGS. 2C-2D for additional details regarding manipulation of reversion control 226 along range bar 222.

Recovery point indicators 228A-222F may be implemented using one or more graphical elements, which may represent versions of the inference model to which a current version of the inference model may be reverted. The graphical elements may be positioned along range bar 222 in an ordering corresponding to relationships between the versions of the inference model. For example, the versions of the inference model may be related to one another by virtue of updates made to the inference model over time. The graphical elements for these versions may be ordered from oldest (e.g., to the left) to the most current (e.g., to the right). Additionally, the positions of recovery point indicators 228A-228F may correspond to the relative quantities of training data indicated by compromise indicator 224.

When reversion control 226 is positioned with one of recovery point indicators 228A-228F, indicators 230-236 may automatically update to display corresponding information. Thus, a user may reposition reversion control 226 to identify how different options for reversions may impact resource expenditures for reversions, durations of time to complete the reversions, etc.

Current model indicator 229 may be implemented using one or more graphical elements, which may represent the current versions of the inference model. The graphical elements may be positioned along range bar 222 in an ordering with respect to the recovery point indicators corresponding to a relationship between the versions of the inference model and the current version of the inference model. For example, the versions of the inference model may be related to one another by virtue of updates made to the inference model over time, and the current model indicator 229 may be associated with the up-to-date model.

To facilitate exploration of the options for reversion associated with each of recovery point indicators 228A-228F, graphical user interface 220 may include indicators 230-236. These indicators may be dynamically updated as reversion control 226 is moved between different recovery point indicators. Any of indicators 230-236 may be implemented using one or more graphical elements, which may include text and/or other visual elements to communicate information to a user a graphical user interface 220.

Reversion cost indicator 230 may convey information regarding costs for performing a reversion. The cost may include computing resource costs (e.g., such as processor time, memory space, storage space, etc.) for performing the reversion. The cost may also include financial costs such as a cost for utilizing on-demand computing resources for performing the reversion (e.g., such as use of public cloud infrastructure with per use fees). Reversion cost indicator 230 may convey information regarding other types of costs without departing from embodiments disclosed herein.

The cost information may be obtained by, for example, analyzing the type and quantity of computations, quantity of training data involved in, and/or other factors which may contribute to costs for performing the reversions.

The resource cost indicated by reversion cost indicator 230 may be based on an aggregate quantity of training data which would be used to untrain an inference model if an untraining process is performed using all of the training data subsequently used to update a previous version of the inference model associated with the recovery point. However, the benefit of the untraining may not necessarily be worth the resource cost. To further granularly explore the training data, the user, as discussed above, may invoke an additional user interface. Through this user interface, the aggregate training data may be granularly explored to select a portion of the training data for use in untraining. By doing so, the user may more efficiently use limited resources available for inference model management.

Reversion savings indicator 232 may convey information regarding savings for performing a partial reversion rather than a complete reversion. For example, if any of recovery point indicators 228C-228F are selected, the reverted model may still include some influence of poisoned training data because the model may not have been reverted to remove the influence of all of the poisoned training data (e.g., may need to revert to recovery point indicators 228B or earlier, in this example). The savings may be expressed, for example, by calculating a ratio of poisoned training data for which the influence is removed versus the total quantity of poisoned training data influence the inference model. The ratio and/or information based on the ratio may indicate to the user the relative quantity of poisoned training data that will still influence the inference model after reversion.

Reversion time estimate indicator 234 may convey information regarding an estimated duration of time for performing the reversion. The information may be estimated, for example, based on the computing resources expected to be expended to complete the reversion.

Poisoned training data metrics indicator 236 may convey information regarding a resource cost saved by performing a partial reversion of the model. The information may be estimated, for example, based on the computing resources expected to be expended to complete the partial reversion versus the computing resources expected to be expended to complete a full reversion (e.g., to remove all influence of the poisoned training data).

Turning to FIG. 2C, a second diagram of graphical user interface 220 in accordance with an embodiments is shown.

To use graphical user interface 220 to select a reversion for an inference model, the user may move reversion control 226 along range bar 222 (may be able to slide along to range bar 222 between discrete positions associated with recovery point indicators 228A-228F). In FIG. 2C, this movement is indicated by the oversized arrow and the retained dashed outline of the reversion control positioned proximate to recovery point indicator 228E. For example, as seen in FIG. 2C, reversion control 226 may slide from being proximate to recovery point indicator 228E to being proximate to recovery point indicator 228C.

While reversion control 226 is moved, indicators 230-236 may be dynamically updated. In this example, reversion cost indicator 230 may indicate that the resource cost for performing a reversion using the poisoned training data introduced into the inference model between recovery point indicator 228C and recovery point indicator 228E may increase due to the increased quantity of poisoned training data for which its influence on the inference model may be removed. For example, to revert the inference model to the state associated with recovery point indicator 228C, the majority of the poisoned training data may need to be used for untraining. Thus, while a partial reversion may be performed, the resource cost for doing so may be greater when compared to performing a reversion to the state associated with recovery point indicator 228E.

Turning to FIG. 2D, a third diagram of graphical user interface 220 in accordance with an embodiments is shown.

Continuing with the discussion from FIG. 2C, if a user determines, based on the information conveyed by indicators 230-236, that even this partial reversion shown in FIG. 2C is insufficient, the user may explore options for performing a full reversion. To do so, the user may use graphical user interface 220 to select a reversion for the inference model by moving reversion control 226 along range bar 222 (may be able to slide along to range bar 222 between discrete positions associated with recovery point indicators 228A-228F) until positioned proximate to recovery point indicators 228B or other inference models not indicated by compromise indicator 224 as being influenced by poisoned training data. In FIG. 2D, this movement is indicated by the oversized arrow and the retained dashed outline of the reversion control positioned proximate to recovery point indicator 228C.

Once reversion control 226 is moved, indicators 230-236 may be dynamically updated. In this example, reversion cost indicator 230 may indicate that the resource cost for performing a reversion using the poisoned training data introduced into the inference model between recovery point indicator 228B and current model indicator 229 may be increased (e.g., when compared to the previously discussed partial reversion), but may be acceptable.

The user may then instruct the selected reversion associated with recovery point indicator 228 to be performed. When selected, model management system 102 may establish remediation plan 208. To do so, information regarding the poisoned training data that influences the inference model may be added to remediation plan 208, as well as information regarding the current version of the inference model. The resulting remediation plan may be usable to drive model update process 204 to obtain an updated inference model that has been reverted from the current version of the inference model through untraining using the training data.

The untraining process may include, for example, (i) dividing the inference model into multiple portions (e.g., placing some layers of neurons on one side of the divide to establish a body and other layers of neurons on the other side of the divide near and output layer to establish a head), (ii) twinning the head, (iii) sequentially (a) training the body and head to reflect the relationships included in unpoisoned training data, and (b) untraining the body and the twined head (e.g., performing a gradient ascent rather than gradient descent optimization) to reduce the predictive ability of the body with respect to the poisoned training data, and (iv) once the body and head lack the ability to predict the relationships defined by the selected poisoned training data (to a predetermined level of lack of predictive ability), establishing an inference model using the body and the head.

Once reverted, the reverted inference model may be used to provide computer implemented services and may be further updated overtime as new training data becomes available.

Figure 2E:
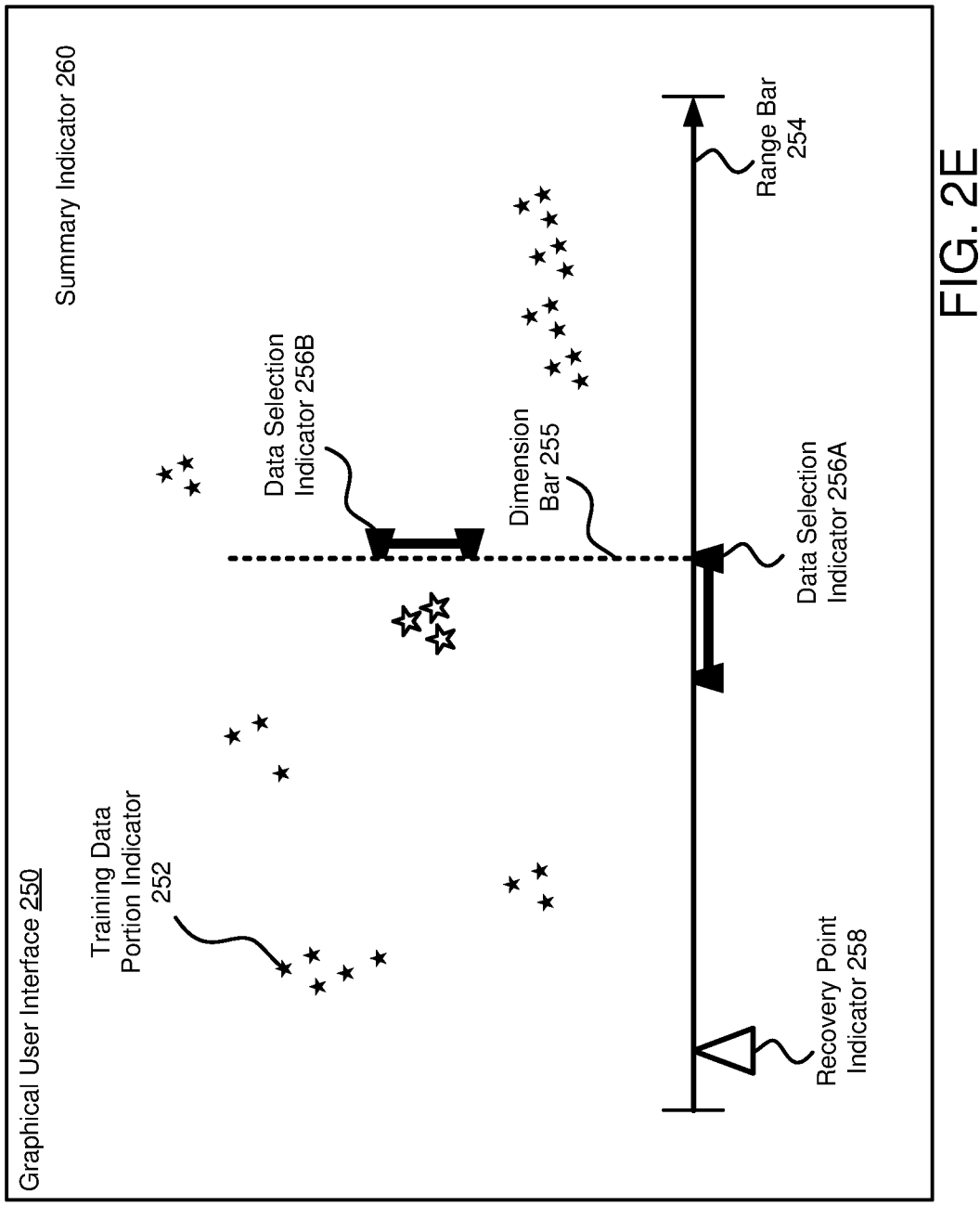

Turning to FIG. 2E, a first diagram showing graphical user interface 250 in accordance with an embodiments is shown. Graphical user interface 250 may be used to (i) provide a user with information regarding various portions of training data and (ii) obtain user input indicating granular selections of some of the training data to be used in a model reversion. The user input may be used to establish a remediation plan (e.g., 208) for an inference model. Graphical user interface 250 may be presented to the user via a display (e.g., through a data processing system used by the person). For example, as discussed with respect to FIG. 2B, graphical user interface 250 may be invoked by a user when a potential reversion associated with a restore point indicator is to be further explored.

To provide the user with information regarding the aggregate training data that will be used in the reversion of the inference model, graphical user interface 250 may include range bar 252, training data indicators (e.g., 252), recovery point indicator 258, data selection indicators (e.g., 256A-256B), and dimension bar 255. Each of these components of graphical user interface 250 is discussed below.

Range bar 254 may be implemented using one or more graphical elements with which other indicators (e.g., 256-258) may be positioned along or nearby. Range bar 254 may be implemented using a line having a length. The positioning of these other indicators along and near range bar 254 may indicate an ordering (e.g., temporal or relative) among the other indicators. For example, training data portion indicators may be positioned above range bar 254 to reflect the temporal order in which corresponding portions of training data were obtained after an updated inference model associated with recovery point indicator 258 was obtained. The temporal order may increase from left to right across the page in FIG. 2E. For example, the training data portion indicators to the right of recovery point indicator 258 may represent training data that was collected after an updated inference model associated with recovery point indicator 258 was obtained. Further distance to the right may indicate that the corresponding training data was obtained longer durations of time after the updated inference model was obtained.

For example, in FIG. 2E, recovery point indicator 258 may indicate that a particular version of an inference model was obtained at a point in time. Training data portion indicators positioned to the right of recovery point indicator 258 may indicate that portions of training data corresponding to the training data portion indicators were obtained after the particular version of the inference model was obtained. The relative distance along range bar 254 each training data portion indicator is located may be proportional to the duration of time after the particular version of the inference model was obtained that the corresponding portion of training data was obtained.

Training data portion indicators (e.g., 252) may be implemented using one or more graphical elements. Each training data portion indicator may be based on a corresponding portion of training data. The location of the training data portion along range bar 254 may correspond to when the portion of training data was obtained. The distance of the training data portion indicator away from range bar 254 may correspond to a dimensionless characterization of the corresponding training data portion.

For example, each training data portion may be a multi-dimensional quantity. To compare different portions of the training data, a dimension reduction process may be performed to obtain a single value representing the portion of training data. The data reduction process may result in different training data portions that have similar dimensions being ascribed with similar singular values. Consequently, the training data portion indicators associated with portions of training data that are similar may be positioned similar distances away from range bar 254.

The dimension reduction process may, for example, be performed through grouping processes (e.g., clustering, classification such as support vector machines, etc.). The relative similarities of the respective portions of training data may be used to ascribe singular values for each portion of training data. Each portion of training data portions may include, for example, features and a corresponding label for the features.

In FIG. 2E, a two dimensional representation of reduced dimensionality training data is shown where the distance away from the bar represents the single dimension based on the training data and the distance along range bar 254 indicates time of acquisition of the training. However, it will be appreciated that higher dimensional representations may be used such as three dimensional plots without departing from embodiments disclosed herein. In such scenarios, the dimensionality reduction may result in reduction from N dimensions to 3 dimensions (e.g., 2 dimensions reflecting the training data and 1 dimension reflecting time) or higher dimensions, depending on how the resulting graphical user interface presents information to a user.

Data selection indicators (e.g., 256A, 256B) may be implemented using one or more graphical elements. The graphical elements may be manipulated by a user to reposition data selection indicator 256A along range bar 254 and data selection indicator 256B along dimension bar 255. The position of the data selection indicator may be used by the user to define portions of training data to be included or excluded from a reversion process. For example, the portion of training data for which training data portion indicators are positioned within an area bounded by data selection indicator 256A and data selection indicator 256B may be treated as being selected or unselected for reversion of an inference model. In this manner, training data for reversion may be granularly selected by a user.

The width of each of data selection indicators 256A, 256B may be modified by the user to increase or decrease the quantity of training data selected. For example, each end of data selection indicator 256A along range bar 254 may be independently manipulated, and the area along range bar 254 between the ends of data selection indicator 256A may be used to identify the portion of training data discriminated by data selection indicator 256A. Data selection indicator 256B may be similarly manipulated to define a two dimensional area in which data may be selected.

Dimension bar 255 and data selection indicator 256B may be dynamically added and removed from graphical user interface 250. For example, both may be added when a user selects data selection indicator 256A, and may be removed once a confirmation of selected training data portion indicators is obtained from the user.

To confirm the selected portion of training data to a user, the training data portion indicators within the area defined by data selection indicators 256A, 256B may change appearance while selected. For example, as seen in FIG. 2E, the training data portion indicators within the area bounded by data selection indicator 256A and data selection indicator 256B are drawn with white infill and are increased in size when compared to other training data portion indicators that are not within the area.

As some of the training data is discriminated using data selection indicators 256A, 256B, summary indicator 260 may be dynamically updated. Summary indicator 260 may be similar to one or more of indicators 230-236. However, rather than basing the information presented by summary indicator 260 on all of the training data, the information presented by summary indicator 260 may only be based on the portion of training data discriminated by the user using data selection indicators 256A-256B (and/or other data selection indicators).

For example, in FIG. 2E, summary indicator 260 may present information regarding a resource cost for performing the reversion using only the portion of the training data highlighted as being selected. However, as the selection is modified, the information presented by summary indicator 260 may be dynamically updated.

Figure 2F:
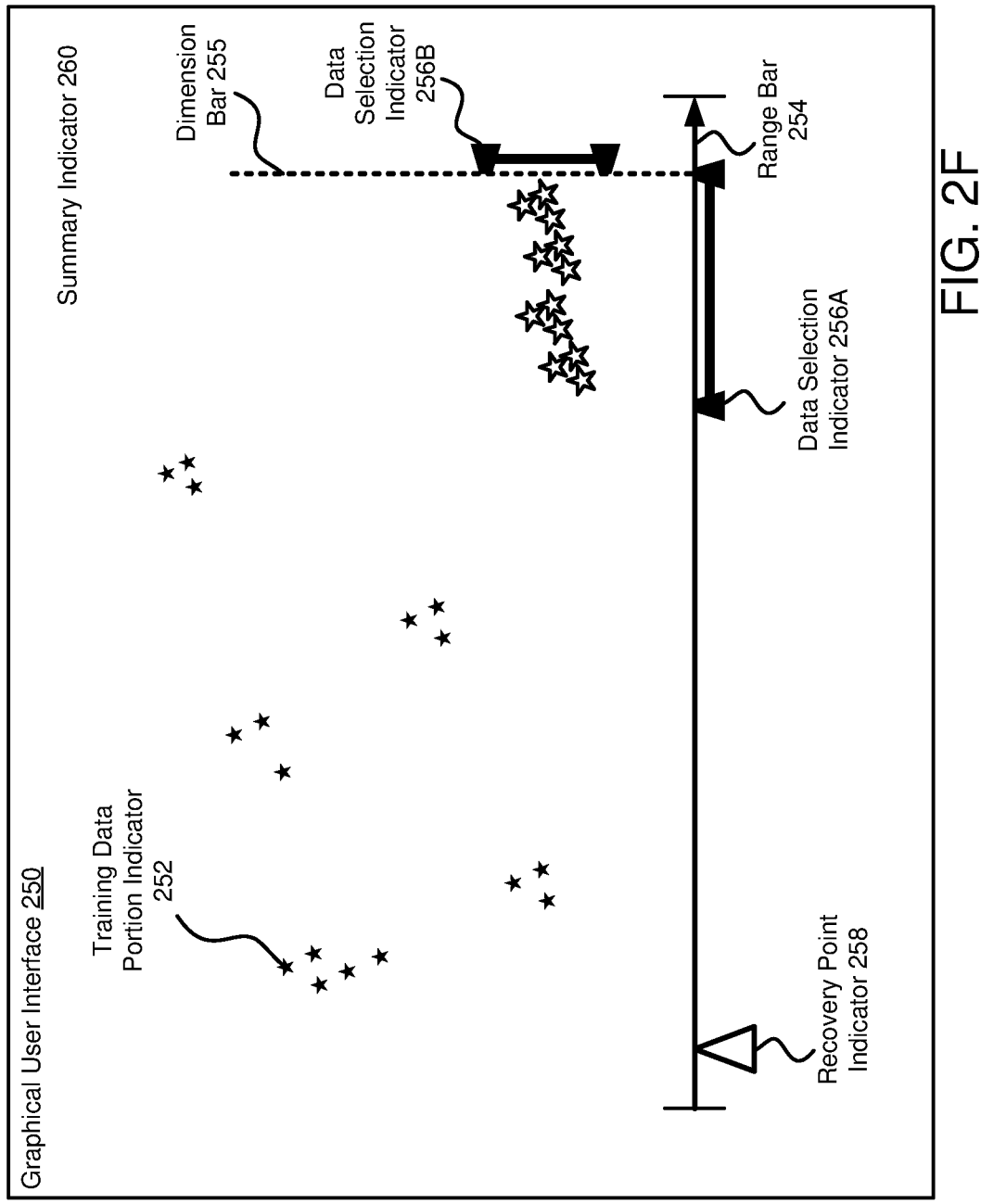

Turning to FIG. 2F, a second diagram showing graphical user interface 250 in accordance with an embodiments is shown. As seen in FIG. 2F, a user has manipulated data selection indicator 256A to be positioned further to the right along range bar 254, when compared to the positioning shown in FIG. 2E.

In this example scenario, changing the location of data selection indicator 256A and data selection indicator 256B may change the quantity of training data discriminated by the user. In this example, the quantity has been increased (e.g., more training data portion indicators highlighted to the user). Consequently, summary indicator 260 may be dynamically updated to reflect the increased resource cost for reverting the inference model using the larger quantity of training data that is discriminated.

To facilitate further granular selection, a user may add multiple data selection indicators to range bar 254. In this manner, the user may granularly select various portions of training data.

Turning to FIG. 2G, a third diagram showing graphical user interface 250 in accordance with an embodiments is shown. As seen in FIG. 2G, a user has added data selection indicator 256C to range bar 254. Any number of data selection indicators may be added by the user, as noted above. To do so, the user may, for example, use a popup menu or other mechanism with respect to range bar 254. The popup menu may include options for adding, removing, and/or otherwise modifying data selection indicators. Once added, a corresponding data selection indicator 256D may be added to dimension bar 255 when data selection indicator 256C is selected.

As seen in FIG. 2G, the data selection indicators 256A-256D may be used to select different portion of training data portion indicators. In this manner, the user may granularly discriminate some training data from all of the training data which influences the inferences. Thus, through this type of training data selection, the influence of only the selected portion of the training data on inferences produced by the inference model may be attenuated through reversion with the selected training data.

Figure 2H:
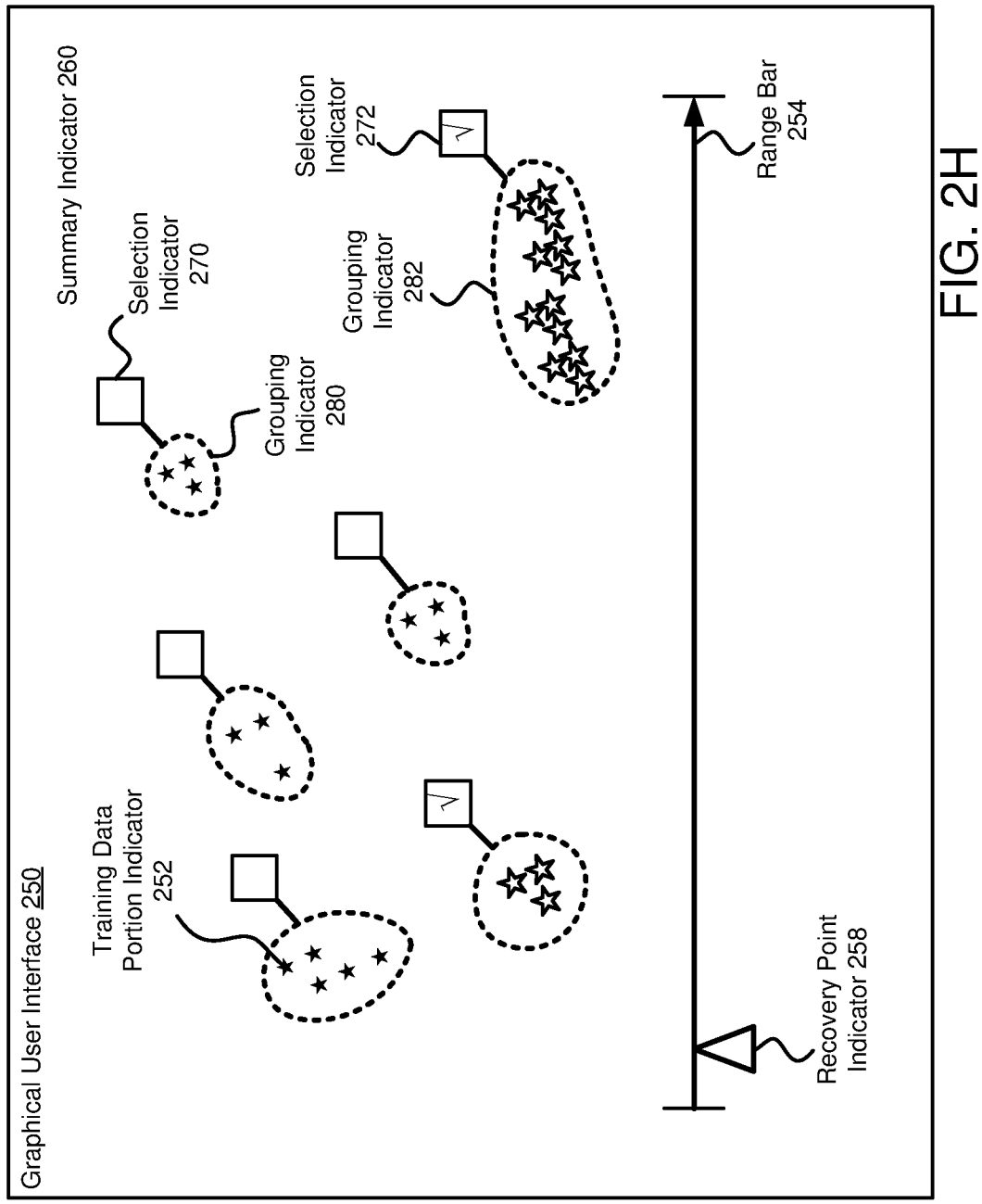

While described as being selected using data selection indicators, it will be appreciated that the selections may be made in other manners. Turning to FIG. 2H, a fourth diagram showing graphical user interface 250 in accordance with an embodiments is shown.

In contrast to FIGS. 2E-2G, portions of training data may be selected by a user in FIG. 2H using grouping indicators (e.g., 280, 282) and selection indicators (e.g., 270, 272).

Grouping indicators may be graphical elements defining areas in which any number of training data indicator portions may be positioned. The grouping indicators may be (i) defined by a user (e.g., a user may trace the outline of a grouping indicator with an input device such as a mouse), (ii) defined based on a criteria (e.g., in an automatic fashion), and/or may be defined in other manners.

If grouping indicators are defined in an automatic manner, the criteria may be, for example, based on clustering or other techniques to divide the training data portion indicators into groups. The grouping indicators may be based on the groupings defined through such processes. For example, a grouping indicator may circumscribe all of the member training data portion indicators of a group. The grouping indicators may be automatically added, or may be added based on user input. For example, if user selects a training data portion indicator, then a grouping indicator may be automatically added to indicate to the user the members of a group. In FIG. 2H, the grouping indicators are drawn using dashed lines, but may have other appearances without departing from embodiments disclosed herein.

Once added, a user may modify the grouping indicators by, for example, dragging and dropping points along the grouping indicators or via other methods.

Selection indicators may be interactive graphical elements associated with corresponding grouping indicators. The selection indicators may allow a user to mark a corresponding grouping indicator as either identify portions of training data that will be used in a reversion or will not be used in a reversion. For example, a user may check (e.g., by double clicking) selection indicator 272 to indicate that the portion of the training data associated with the training data portion indicators within grouping indicator 282 is to be considered for a reversion. In contrast, a user may uncheck (e.g., by not clicking or otherwise removing a check through double clicking) selection indicator 270 to indicate that the portion of the training data associated with the training data portion indicators within grouping indicator 288 is not to be considered for a reversion.

As different selection indicators are manipulated by a user to granularly discriminate some training data for consideration in a future reversion, summary indicator 260 may be dynamically updated accordingly.

As discussed above, the components of FIG. 1 may perform various methods to manage inference models used to provide computer implemented services. FIGS. 3A-3B illustrate methods that may be performed by the components of the system of FIG. 1. In the diagram discussed below and shown in FIGS. 3A-3B, any of the operations may be repeated, performed in different orders, and/or performed in parallel with or in a partially overlapping in time manner with other operations.

Turning to FIG. 3A, a flow diagram illustrating a method for providing computer implemented services using inference models in accordance with an embodiment is shown. The method may be performed by any of client 100, model management system 102, and/or other components of the system shown in FIG. 1.

Prior to operation 300, training data may be obtained and used to train one or more inference models. Additionally, as further training data becomes available, there inference models may be updated. However, at least some of the training data may be poisoned thereby tainting the updated inference model versions.

At operation 300, an inference model that is tainted through training using poisoned training data is identified. The inference model may be identified by identifying that the inference model was obtained through, at least in part, an update using the poisoned training data. The poisoned training data may be identified via any method (e.g., analysis of training data used to update inference models, by receiving notifications regarding poisoned training data, etc.).

The identification may be made using information regarding the training data upon which each inference model is based. Such information may be recorded as the inference models are updated over time.

The identification may be made via other methods without departing from embodiments disclosed herein.

At operation 302, a first resource cost for reverting the inference model to remove influence of the poisoned training data on the inference model is identified. The first resource costs may be identified by identifying all of the poisoned training data upon which the inference model is based and estimating a resource cost for performing untraining based on the poisoned training data.

The estimates may be obtained, for example, (i) using an empirical formula, (ii) using a fit function or inference model trained on historical quantities of resources expended for performing reversions based on different amounts of training data, (iii) using estimates provided by other entities, and/or via other methods.

At operation 304, user input indicating selection of a portion of the poisoned training data is obtained using a graphical user interface. The graphical user interface may be based at least in part on the first resource cost. The user input may be obtained using the method illustrated in FIG. 3B.

At operation 306, a second resource cost for reverting the inference model to remove influence of the portion of the poisoned training data on the inference model is identified. The second resource costs may be identified by estimating a resource cost for performing untraining based on the portion of the poisoned training data.

The estimates may be obtained, for example, (i) using an empirical formula, (ii) using a fit function or inference model trained on historical quantities of resources expended for performing reversions based on different amounts of training data, (iii) using estimates provided by other entities, and/or via other methods.

At operation 308, a reversion plan for the inference model based on the second resource cost is obtained. The reversion plan may be obtained by populating a data structure with information regarding the portion of the training data such that an untraining process may be performed with the portion of the training data.

At operation 310, the version plan is performed to obtain an updated inference model. The reversion plan may be performed by untraining the inference model using the portion of the training data specified by the reversion plan to obtain the updated inference model.

At operation 312, the updated inference model is used to provide computer implemented services. The computer implemented services may be provided by (i) initiating generation of inferences using the updated inference model, and (ii) using the generated inferences to provide, at least in part, the computer implemented services. The computer implemented services may ingest or otherwise use the generated inferences to perform various actions as part of the computer implemented services.

The method may end following operation 308.

Turning to FIG. 3B, a flow diagram illustrating a method of obtaining user input indicating selection of a portion of poisoned training data in accordance with an embodiment is shown. The method may be performed by any of client 100, model management system 102, and/or other components of the system shown in FIG. 1.

At operation 320, a graphical user interface is presented to a user. The graphical user interface may include a range bar, training data portion indicators, and data selection indicators. The data selection indicators may discriminate a portion of the training data portion indicators. The portion of the training data portion indicators may be associated with a portion of poisoned training data.

The graphical user interface may be presented to a user by (i) presenting a graphical user interface similar to that illustrated in FIGS. 2B-2D, (ii) obtaining first user input indicating selection of a restoration point indicator and invocation of a second graphical user interface, and (iii) presenting the second graphical user interface based on the user input. The second graphical user interface may be similar to that illustrated in FIGS. 2E-2H.

While presented to the user, the user may manipulate training data portion indicators to select the portion of the training data portion indicators. The training data corresponding to the portion of the training data portion indicators may be the portion of the poisoned training data.

At operation 322, user input to position the data selection indicators along the range bar is obtained. The position of the data selection indicators may define the portion of the training data portion indicators discriminated in operation 322. The user input may be received from the user through movement of a pointing device or other type of user interface device.

Changing the selection of the portion of the training data portion indicators may cause a summary indicator to be automatically updated. The summary indicator may be automatically updated, in part, by calculating a resource cost for performing a reversion using only the training data associated with the portion of the training data portion indicators (rather than all of the training data portion indicators). Thus, the resource cost may be reduced when compared to a resource cost as calculated in operation 302.

The method may end following operation 322.

Figure 4:
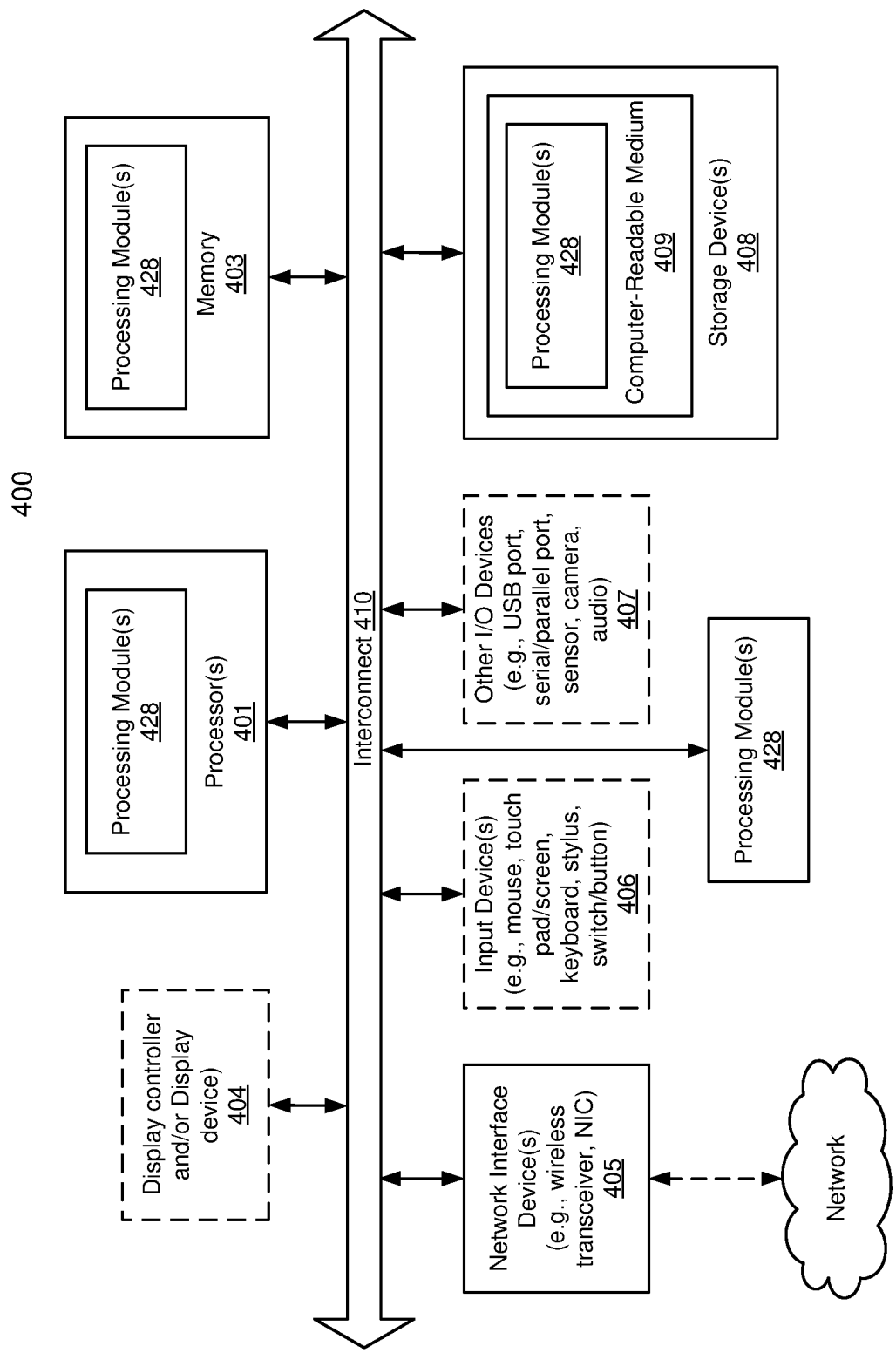
FIG. 4 shows a block diagram illustrating a data processing system in accordance with an embodiment.

Any of the components illustrated in FIGS. 1-2H may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing inference models, the method comprising:
    identifying an inference model of the inference models that is tainted through training using poisoned training data;
    identifying a first resource cost for reverting the tainted inference model to remove influence of the poisoned training data on the tainted inference model;
    obtaining, using a graphical user interface, user input indicating a selection of a portion of the poisoned training data;
    identifying a second resource cost for reverting the tainted inference model to remove influence of the portion of the poisoned training data on the tainted inference model;
    obtaining a reversion plan for the tainted inference model based on the second resource cost;
    performing the reversion plan to obtain an updated inference model; and
    using the updated inference model to provide computer implemented services.

2. The method of claim 1, wherein obtaining the user input comprises:
    presenting, to a user, the graphical user interface comprising:

a range bar,
training data portion indicators, and
data selection indicators that discriminate a portion of the training data portion indicators, the portion of the training data portion indicators being associated with the portion of the poisoned training data; and
obtaining, from the user via the graphical user interface, the user input to position the data selection indicators along the range bar, the position of the data selection indicators defining the portion of the training data portion indicators.

3. The method of claim 2, wherein obtaining the user input comprising:
reducing a dimensionality of the poisoned training data to obtain locations for the training data portion indicators; and
placing each training data portion indicator at a corresponding location of the locations, the locations being relative to the range bar.

4. The method of claim 3, wherein the range bar defines a first axis of a two dimensional plot, with the first axis representing time progression and a second axis of the two dimensional plot representing the reduced dimensionality of the poisoned training data.

5. The method of claim 4, wherein each portion of the poisoned training data is multidimensional, and reducing the dimensionality of each portion of the poisoned training data provides a single magnitude for the respective portion of the poisoned training data.

6. The method of claim 5, wherein each of the training data portion indicators is positioned:
along the range bar based on when a corresponding portion of the poisoned training data was obtained, and
a distance away from the range bar based on the single magnitude for the corresponding portion of the poisoned training data.

7. The method of claim 2, wherein the second resource cost is less than the first resource cost.

8. The method of claim 7, wherein performing the reversion plan to obtain the updated inference model comprises:
training the tainted inference model based on portion of the poisoned training data to reduce the predictive power of the tainted inference model for relationships defined by the portion of the poisoned training data.

9. A non-transitory machine-readable medium having instructions stored therein, which when executed by a processor, cause the processor to perform operations for managing inference models, the operations comprising:
identifying an inference model of the inference models that is tainted through training using poisoned training data;
identifying a first resource cost for reverting the tainted inference model to remove influence of the poisoned training data on the tainted inference model;
obtaining, using a graphical user interface, user input indicating a selection of a portion of the poisoned training data;
identifying a second resource cost for reverting the tainted inference model to remove influence of the portion of the poisoned training data on the tainted inference model;
obtaining a reversion plan for the tainted inference model based on the second resource cost;
performing the reversion plan to obtain an updated inference model; and
using the updated inference model to provide computer implemented services.

10. The non-transitory machine-readable medium of claim 9, wherein obtaining the user input comprises:
presenting, to a user, the graphical user interface comprising:
a range bar,
training data portion indicators, and
data selection indicators that discriminate a portion of the training data portion indicators, the portion of the training data portion indicators being associated with the portion of the poisoned training data; and
obtaining, from the user via the graphical user interface, the user input to position the data selection indicators along the range bar, the position of the data selection indicators defining the portion of the training data portion indicators.

11. The non-transitory machine-readable medium of claim 10, wherein obtaining the user input comprising:
reducing a dimensionality of the poisoned training data to obtain locations for the training data portion indicators; and
placing each training data portion indicator at a corresponding location of the locations, the locations being relative to the range bar.

12. The non-transitory machine-readable medium of claim 11, wherein the range bar defines a first axis of a two dimensional plot, with the first axis representing time progression and a second axis of the two dimensional plot representing the reduced dimensionality of the poisoned training data.

13. The non-transitory machine-readable medium of claim 12, wherein each portion of the poisoned training data is multidimensional, and reducing the dimensionality of each portion of the poisoned training data provides a single magnitude for the respective portion of the poisoned training data.

14. The non-transitory machine-readable medium of claim 13, wherein each of the training data portion indicators is positioned:
along the range bar based on when a corresponding portion of the poisoned training data was obtained, and
a distance away from the range bar based on the single magnitude for the corresponding portion of the poisoned training data.

15. The non-transitory machine-readable medium of claim 9, wherein the second resource cost is less than the first resource cost.

16. The non-transitory machine-readable medium of claim 15, wherein performing the reversion plan to obtain the updated inference model comprises:
training the tainted inference model based on portion of the poisoned training data to reduce the predictive power of the tainted inference model for relationships defined by the portion of the poisoned training data.

17. A data processing system, comprising:
a processor; and
a memory coupled to the processor to store instructions, which when executed by the processor, cause the processor to perform operations for managing inference models, the operations comprising:
identifying an inference model of the inference models that is tainted through training using poisoned training data;
identifying a first resource cost for reverting the tainted inference model to remove influence of the poisoned training data on the tainted inference model;

obtaining, using a graphical user interface, user input indicating a selection of a portion of the poisoned training data;

identifying a second resource cost for reverting the tainted inference model to remove influence of the portion of the poisoned training data on the tainted inference model;

obtaining a reversion plan for the tainted inference model based on the second resource cost;

performing the reversion plan to obtain an updated inference model; and using the updated inference model to provide computer implemented services.

18. The data processing system of claim 17, wherein obtaining the user input comprises:

presenting, to a user, the graphical user interface comprising:
 a range bar,
 training data portion indicators, and
 data selection indicators that discriminate a portion of the training data portion indicators, the portion of the training data portion indicators being associated with the portion of the poisoned training data; and obtaining, from the user via the graphical user interface, the user input to position the data selection indicators along the range bar, the position of the data selection indicators defining the portion of the training data portion indicators.

19. The data processing system of claim 18, wherein obtaining the user input comprising:

reducing a dimensionality of the poisoned training data to obtain locations for the training data portion indicators; and placing each training data portion indicator at a corresponding location of the locations, the locations being relative to the range bar.

20. The data processing system of claim 19, wherein the range bar defines a first axis of a two dimensional plot, with the first axis representing time progression and a second axis of the two dimensional plot representing the reduced dimensionality of the poisoned training data.

* * * * *